Dec. 29, 1953        G. G. KENNEY        2,664,491

ELECTRIC HEATER APPLIANCE FOR LUNCH BOXES

Filed Nov. 15, 1950

Inventor
Guy Gilbert Kenney
By Oliver B. Kaiser
Attorney

Patented Dec. 29, 1953

2,664,491

UNITED STATES PATENT OFFICE 2,664,491

ELECTRIC HEATER APPLIANCE FOR LUNCH BOXES

Guy Gilbert Kenney, Cincinnati, Ohio

Application November 15, 1950, Serial No. 195,772

2 Claims. (Cl. 219—35)

This invention relates to an electric heater unit for heating, toasting or other heat treatment of human edible products and particularly adaptable for ready installation within a conventional type of sheet metal lunch box for heating the food packaged therein without liability of scorching or burning the same and adaptable for service independent of the lunch box.

An object of the invention is to provide an electric heater appliance for the heating and cooking of food adapted to be removably inserted within a conventional type of sheet metal lunch box for heating the food deposited in the lunch box upon a tray therein sustained and spaced from the heater appliance to a degree to avoid burning or scorching the food and which when removed from the box offers service as a grill for food heating or cookery which could not be conveniently or satisfactorily effected when the appliance is disposed within a lunch or the like box.

Another object is to provide an electric heater appliance for heating food within a container comprising a pan shaped casing having an apertured cover plate to form a chamber for housing and mounting an electric heater element therein and spaced from the cover plate, the apertures in the cover plate peripherally surrounding the electric heater element for a circulation of the heat radiating from said element from said chamber and beneath a food holding tray or receptacle spacedly supported upon said cover plate and electric circuit switch control means manually and thermostatically operatively housed and mounted within said casing at one end thereof.

Various other features and advantages of the invention will be more fully set forth and apparent from the following description of the drawings accompanied herewith and forming a part hereof, depicting a preferred embodiment in which.

Figure 1:
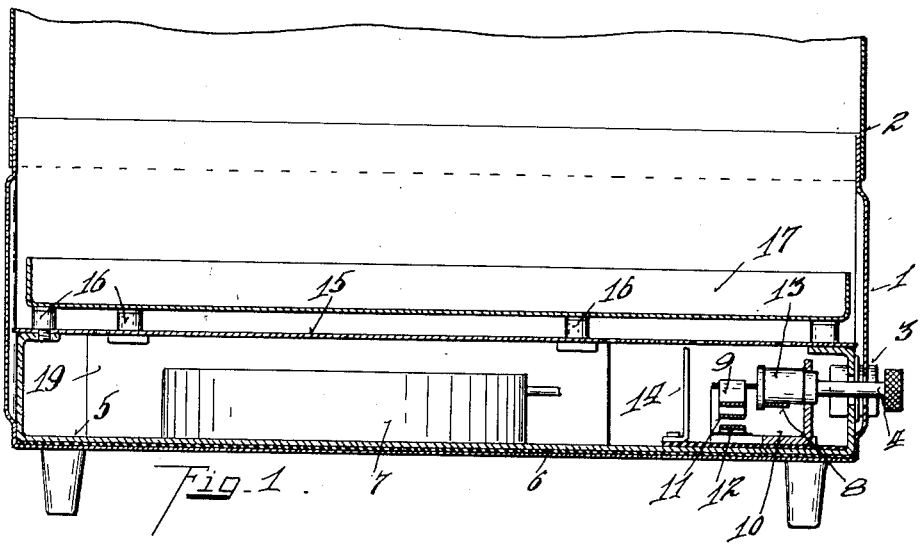
Figure 1 is a central vertical section of a conventional type of sheet metal lunch box and the improved electric heater appliance removably installed therein, resting or sustained upon the base or bottom of the body of the box.

The construction outline design of the electric heater appliance as illustrated, is particularly for its adaption within a conventional sheet metal lunch box, for heating food packaged therein, to a determined degree, without liability of scorching the food or burning a tissue or other type of sheet wrapper with which some of the food may be covered, so that the user need not give further attention to the unit after the necessary electric current connection is made for a period in advance of the time that he desires or has available to consume the food. The electric heater appliance also has utility separate and apart from the lunch box for domestic cookery or food heating service, as example poaching eggs, preparing certain kinds of sandwiches, and popping corn, so as to be more accessible than when confined within a lunch box.

Referring to the drawings, 1 indicates the body of a conventional type of sheet metal lunch box, of rectangular outline, having a crown form of cover 2, in hinged and latched connection with the body, as for embodying a cylindrical jar therein. The cover commonly at its head end exteriorly is equipped with a hand hold for box carriage. One end wall of the body is apertured, for projecting therethrough the snout end of a cord plug attaching or electric circuit coupling receptacle 3 and a manually operated electric switch regulating and control stem 4, as parts of the fixtures of the heater appliance, to expose the same an exterior side of a wall of the box and which enables the heater appliance to be readily installed and withdrawn from the box for use independent thereof, thereby materially increasing its utility.

The electric heater appliance comprises a rectangular pan-shaped casing 5, in outline size corresponsive to the interior dimension of the body of the lunch box and seated upon the upper or inner side of the bottom of the body of the lunch box, which has its surface covered with an insulation layer 6.

A common type of electric heater 7, as composed of a porcelain or insulator base having its face side spirally or otherwise channeled for recessively mounted an open coiled wire resistance element therein, with the opposite ends of the element clamped to the base in adjoining spaced relation for making a conductor connection respectively with each thereof. The design and type of electric heater is merely selective, it being recognized that it may be of various forms of construction, the detail of construction thereof being separate and apart herefrom. One of the terminals of the resistance element of the electric heater is in conductor connection directly with the electric circuit coupling receptacle 3, while the other terminal of that of the coiled resistance element is in series circuit connection with a circuit controlling switch, manually and thermostatically operated and the opposite pole of said electric circuit coupling element 3.

The thermostatic and manually operated electric switch as herein exemplified is disposed within the casing 5 at the end thereof carrying the electric circuit coupling receptacle 3 and which comprises a pair of flat spring metal strips or blades 8 and 9 in spaced parallelism, at one end mounted upon a bracket 10 and insulated and longitudinally extending therefrom. The bracket is mounted upon the base of the casing 5 and insulated therefrom.

The blade 9 of the electric switch, at its forward end has a tongue extending laterally therefrom to overlie the relative end of the blade 8, for contact therewith. The blade 9 at its lower side and forward end, is sustained by a blade 11, extending longitudinally therebeneath to limit the retracting movement of the blade 9 and permit the same to be automatically moved by a thermostat blade 12, extending longitudinally of and beneath the switch blade 9, to engage therewith in an upward movement effected by the temperature within the lunch box. The rear end of the thermostat blade 12 is insulated from and fixed to the base of the bracket 10 and from its connection therewith inclines upwardly.

The switch blade 8 underlies and is engaged by a control sleeve or collar 13 of eccentric or elliptical contour, fixed to and carried by the stem 4, traversing and journaled within an upstanding limb 14 of the bracket 10. The stem 4 has a reach to extend through an aperture in the end wall of the lunch box to expose the same exteriorly thereof and render the same accessible for manual rotation.

The eccentric collar can be set to break the electric circuit closing contact of the switch blades 8 and 9 and to adjustably set the same while in contact with each other for thermostatic regulation by movement of the blades 8 and 9 unitarily or conjointly to and from the thermostat blade 12. A portion of the thermocontrol switch mechanism is guarded from the heat chamber within the casing by a partition 14.

The construction of the thermo-control switch mechanism or device is optional and in detail, as herein exemplified, is merely selective separate and apart hereof.

The casing 5 of the electric heater appliance has its upper side covered by an apertured plate 15, suitably secured to the walls of the casing by stud bolts 16, with their heads extending or projecting a determined distance above the plane of the top surface of the plate, as rests, to spacedly sustain a pan or tray 17 for the reception of food, from direct contact with the cover plate 15. The cover plate 15 is also disposed in spaced relation from the electric heater element 7.

Figure 2:
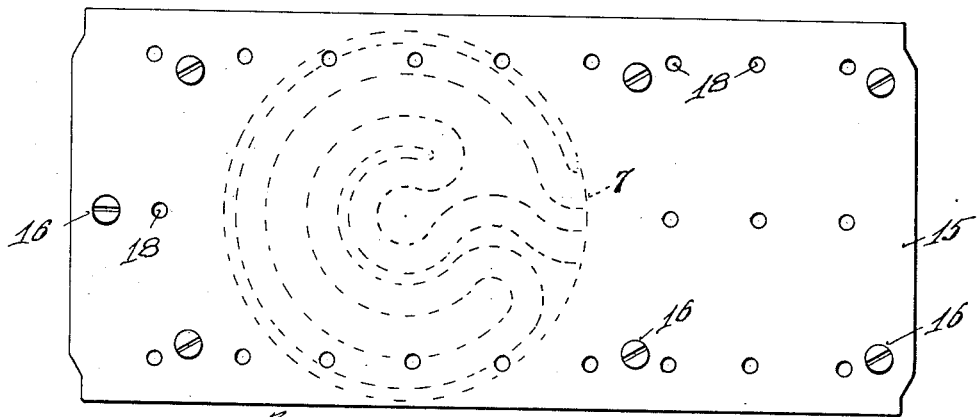
Figure 2 is a top plan view of a perforated tray or platen for the head of the electric heater appliance.
Figures 3, 4:
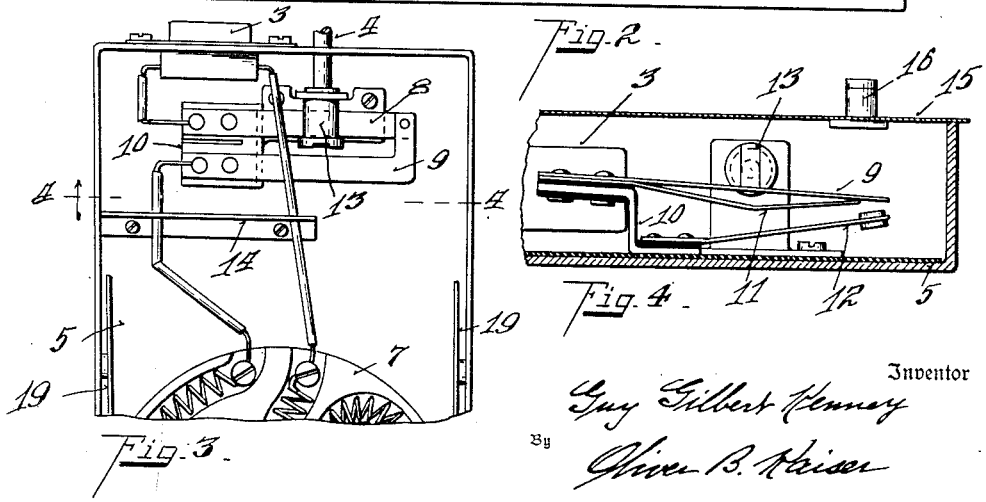
Figure 3 is a top plan view of an end section of the electric heater appliance with the top perforated tray or platen removed and comprising the thermostatic controlled electric switch mechanism in circuit connection with an electric heater element.
Figure 4 is a slightly enlarged section taken on line 4, 4, Figure 3.

As shown in Figure 2, the cover plate 15 has a series of apertures 18, in a row marginally inward, respectively from each of its longitudinal ends and at points intermediate thereof at opposite sides of the electric heater element 7, thereby to provide for a circulation of the radiant heat transmitted from the electric heater element within the heater chamber formed by the casing and cover plate 15 and upwardly therefrom through the apertures in the cover plate 15 and about the spacing between the cover plate and base of the food holding tray or receptacle 17, which under a determined maximum degree of temperature will not scorch or burn the food supported upon or carried by the tray or tissue paper or similar covering packaging the food.

The electric heater appliance including the tray or receptacle 17 for service independent and removed from the lunch box, serves as a grill so that the tray 17 provides a frying surface and the electric heater element may be provided with an auxiliary independent electric circuit control switch for a plurality of different temperature heats when not housed in a lunch box or the like, and to which an electric cord plug could be coupled independent of the electric circuit coupling receptacle 3, and when the unit is not housed in the lunch box.

The opposite longitudinal side walls of the casing 5 of the electric heat appliance may be insulated, each at its inner side, by a sheet metal plate 19, for a portion of its length and slightly spaced therefrom and from the electric heater element 7, primarily to prevent scorching or marring the finished surfaces of the lunch box 1, at which their inner side may bear or contact with the side walls of the casing 5, particularly if the electric heater element 7 is of circular form.

Having described my invention, I claim:

1. A lunch box of the conventional type sheet metal structure, comprising a body section, a cover section for the body section, a casing removably supported within said body section for the lower portion thereof, an apertured closure plate for the upper side of said casing fixed thereto, an electric heater element within said casing in spaced relation beneath said apertured closure plate, electric circuit control mechanism mounted within said casing at one end thereof having a manually operable electric circuit control switch accessible from an exterior end of said casing and correspondingly from the body section of said box, thermostatically operated electric circuit control means within said casing to automatically control and cut off the electric current to said electric heater element at a determined degree of temperature within said lunch box and a tray removably mounted upon said casing in spaced relation from its apertured cover plate for sustaining the food packaged within said box.

2. A lunch box of the conventional type sheet metal structure, comprising a body section, a cover section for the body section, a casing removably supported within said body section for the lower portion thereof, an apertured closure plate for the upper side of said casing fixed thereto, and electric heater element within said casing in spaced relation beneath said apertured closure plate, electric circuit control mechanism mounted within said casing at one end thereof having a manually operable electric circuit control switch accessible from an exterior end of said casing and correspondingly from the body section of said box, thermostatically operated electric circuit control means within said casing to automatically control and cut off the electric current to said electric heater element at a determined degree of temperature within said lunch box, means carried by said casing extending from an end thereof and through an aperture in a corresponding side body section of the lunch box for making electrical connection with the electrical elements within and carried by said casing, and a tray removably mounted upon said casing in spaced relation from its apertured cover plate for sustaining the food packaged within said box.

GUY GILBERT KENNEY.

References Cited in the file of this patent

UNITED STATES PATENTS

| Number | Name | Date |
|---|---|---|
| 843,775 | Taliaferro | Feb. 12, 1907 |
| 1,990,640 | Doherty | Feb. 12, 1935 |
| 2,187,196 | Douglass | Jan. 16, 1940 |
| 2,274,285 | Walker | Feb. 24, 1942 |
| 2,505,405 | Jarboe | Apr. 25, 1950 |
| 2,545,127 | Wnuk | Mar. 13, 1951 |
| 2,585,310 | Gronlund | Feb. 12, 1952 |